United States Patent
Cole et al.

(10) Patent No.: US 10,157,473 B2
(45) Date of Patent: Dec. 18, 2018

(54) METHOD FOR PROVIDING RANGE ESTIMATIONS

(71) Applicant: BAE Systems Information and Electronic Systems Integration Inc., Nashua, NH (US)

(72) Inventors: Kevin C. Cole, Nashua, NH (US); Michael N. Mercier, Nashua, NH (US); Joseph M. Schlupf, Newburyport, MA (US); Joseph Su, Amherst, NH (US); Aaron Stark, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 227 days.

(21) Appl. No.: 15/108,605

(22) PCT Filed: Oct. 20, 2015

(86) PCT No.: PCT/US2015/056479
§ 371 (c)(1),
(2) Date: Jun. 28, 2016

(87) PCT Pub. No.: WO2016/114828
PCT Pub. Date: Jul. 21, 2016

(65) Prior Publication Data
US 2016/0371856 A1    Dec. 22, 2016

Related U.S. Application Data

(60) Provisional application No. 62/066,043, filed on Oct. 20, 2014.

(51) Int. Cl.
*G06T 7/60* (2017.01)
*G01S 11/12* (2006.01)

(52) U.S. Cl.
CPC ............ *G06T 7/60* (2013.01); *G01S 11/12* (2013.01); *G06T 2207/10004* (2013.01)

(58) Field of Classification Search
CPC .................. G06T 7/60; G01S 11/12
See application file for complete search history.

(56) References Cited

U.S. PATENT DOCUMENTS

| | | | | |
|---|---|---|---|---|
| 5,128,874 A | * | 7/1992 | Bhanu | G01C 21/165 342/55 |
| 6,567,538 B1 | * | 5/2003 | Pelletier | G01N 21/8915 382/111 |

(Continued)

FOREIGN PATENT DOCUMENTS

WO    PCT/US2015/056479    7/2016

*Primary Examiner* — Jonathan R Messmore
(74) *Attorney, Agent, or Firm* — Antony P. Ng; Russell Ng PLLC

(57) ABSTRACT

An mechanism for range estimation mapping that includes creation of a world map on an azimuth/elevation (AZ/EL) grid, relation of the grid to an earth-fixed north, east, and down (NED) coordinate system through an address table, and association of each pixel in each frame, by a programmable device, with an entry from the address table in order to determine a range is discussed. The associations may be repeated for each frame while an updated world map and address table are generated. When an updated address table is complete, the process may begin anew using the updated data.

14 Claims, 9 Drawing Sheets

(56) References Cited

U.S. PATENT DOCUMENTS

| | | | | |
|---|---|---|---|---|
| 2007/0073454 A1* | 3/2007 | Kaji | ................ | B63B 21/00 |
| | | | | 701/21 |
| 2013/0241595 A1 | 9/2013 | Kelem et al. | | |
| 2014/0229039 A1 | 8/2014 | Murphy | | |
| 2015/0317834 A1* | 11/2015 | Poulos | ................ | G06F 3/012 |
| | | | | 345/619 |

* cited by examiner

METHOD FOR PROVIDING RANGE ESTIMATIONS

RELATED APPLICATION

This application claims the benefit of, and priority to, U.S. Provisional Patent Application Ser. No. 62/066,043, filed Oct. 20, 2014, which is incorporated herein by reference in its entirety.

BACKGROUND

Determining range to a particular pixel in a data capture (frame) is important to evaluating the proximity of an observing platform to an observed phenomenon and for correctly identifying the observed phenomenon. For example, a military aircraft often needs to know the proximity of a threat launch to effectively neutralize the threat. Additionally, in order to properly identify the observed phenomenon as a threat, the range must be known before an accurate observable signature can be identified.

SUMMARY

According to exemplary embodiments a method for inertially stabilized range estimation mapping creates a world map on an azimuth and elevation (AZ/EL) grid, generates an address table to relate the grid to an earth-fixed north, east, and down (NED) coordinate system, and employs a programmable device to associate each pixel in each frame with an entry from the address table. These associations are repeated for each frame while an updated world map and address table are generated. When the updated address table is complete, the process begins anew using the updated data.

Inertial stabilization is achieved because AZ/EL coordinates are defined by the position of the observation platform. Converting the AZ/EL grid to NED provides definition in relation to the earth for finding distance. Real-time range estimation on each frame is possible because, once a world map is generated, the address table enables a programmable device to rapidly determine a range to each pixel. Accordingly, a method for inertially stabilized range estimation mapping with real-time range estimation capability is presented wherein range to every pixel of every frame can be estimated.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Figure 1:
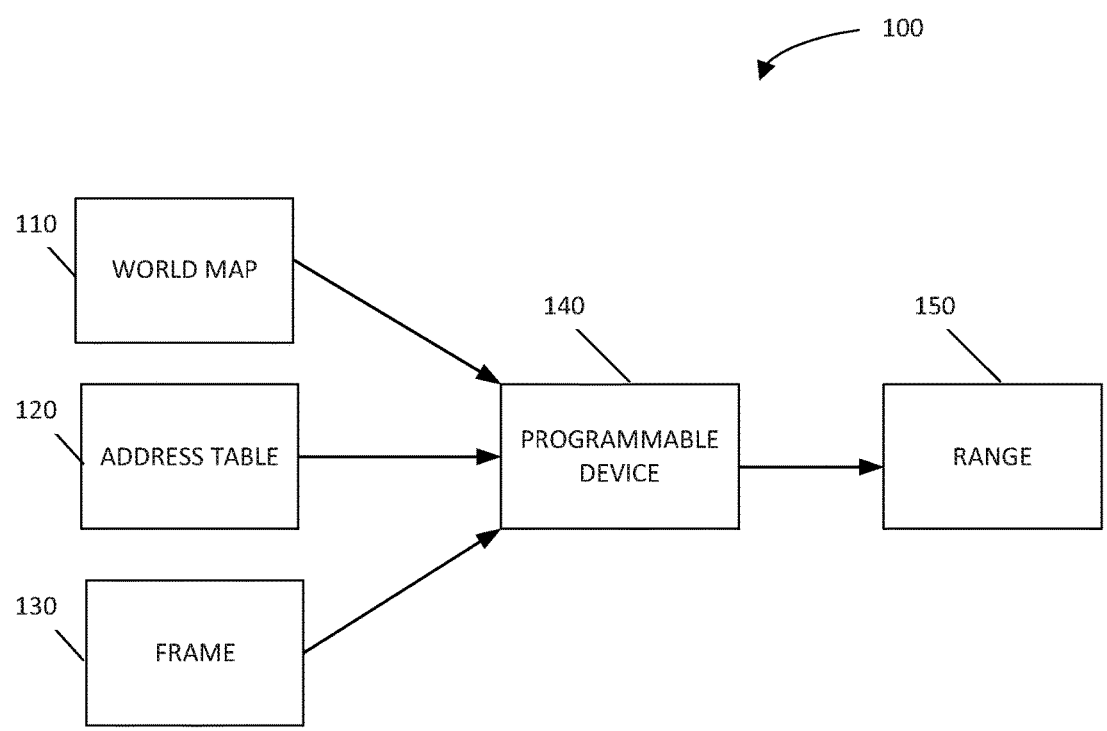
FIG. 1 is a schematic drawing illustrating a system for inertially stabilized range estimation mapping, according to an example embodiment.

Traditional methods for estimating range include generating a Digital Terrain Elevation Data (DTED) or other suitably formatted map using a ray casting technique. In this conventional method, the map is created by "casting" rays and determining the distance at which the earth, or another object, is intersected. However, to achieve acceptable levels of resolution, this technique requires casting of hundreds of thousands of rays or more at a large number of azimuth/elevation angular orientations. Further, obtaining a range estimate for each pixel in a frame requires the ability to generate estimates at a rate of millions per second. Therefore, due to host platform processing limitations, it may be impossible to regenerate the map to get estimates in real-time for every frame using these traditional methods when a moving platform, such as an aircraft, is constantly changing position.

Embodiments of the present invention provide inertially stabilized range estimation mapping that is capable of real-time range estimation enabling the estimation of a range to every pixel of every frame in a data capture. System, methods and computer readable medium are described herein for inertially stabilized range estimation mapping wherein a world map is created on an azimuth/elevation (AZ/EL) grid, an address table is used to relate the grid to an earth-fixed north, east, and down (NED) coordinate system, and a programmable device is employed to associate each pixel in each frame with an entry from the address table in order to determine a range. These associations may be repeated for each frame while an updated world map and address table are generated. When the updated address table is complete, the process may begin anew using the updated data.

In an exemplary embodiment, inertial stabilization is achieved because AZ/EL coordinates are defined by the position of the observation platform. Converting the AZ/EL grid to NED coordinates provides definition in relation to the earth for the purpose of finding distance. An address table is created to relate these two coordinate frames and indicate a distance from the observation point. In an example embodiment, processing resources are conserved and lookup speed is increased by using a compression scheme to reduce the size of the world map table from a 24-bit table to a smaller one, for example a 17-bit table.

In an embodiment, real-time range estimation for each frame is provided because the generated address table that associates a portion the world map with a NED coordinate system allows a programmable device to rapidly determine a range to each pixel. While any processor or processing device can be used to perform this lookup function, in an exemplary embodiment, a Field-Programmable Gate Array (FPGA) is used to perform this function. An exemplary embodiment further uses two computer-readable media to store data pertaining to the world-map and the address table. While one such medium is used for current lookups, the other simultaneously generates an updated world map. When the updated map is completed, the lookup and generation functions switch. Thus, the map is constantly updated in relation to movement of the host platform.

A frame as used herein may refer to an image in a series of images or a still shot from a video clip or stream. A plurality of frames may be captured by an imaging sensor coupled to a moveable host platform described below. A frame may be analyzed to determine the range or distance between one or more pixels in the frame and the location of the imaging sensor and the host platform.

FIG. 1 is a schematic drawing illustrating a system 100 for range estimation mapping, according to an example embodiment. The system 100 includes a world map component 110, an address table component 120, a frame component 130, a programmable device 140, and a range output component 150.

Figure 2:
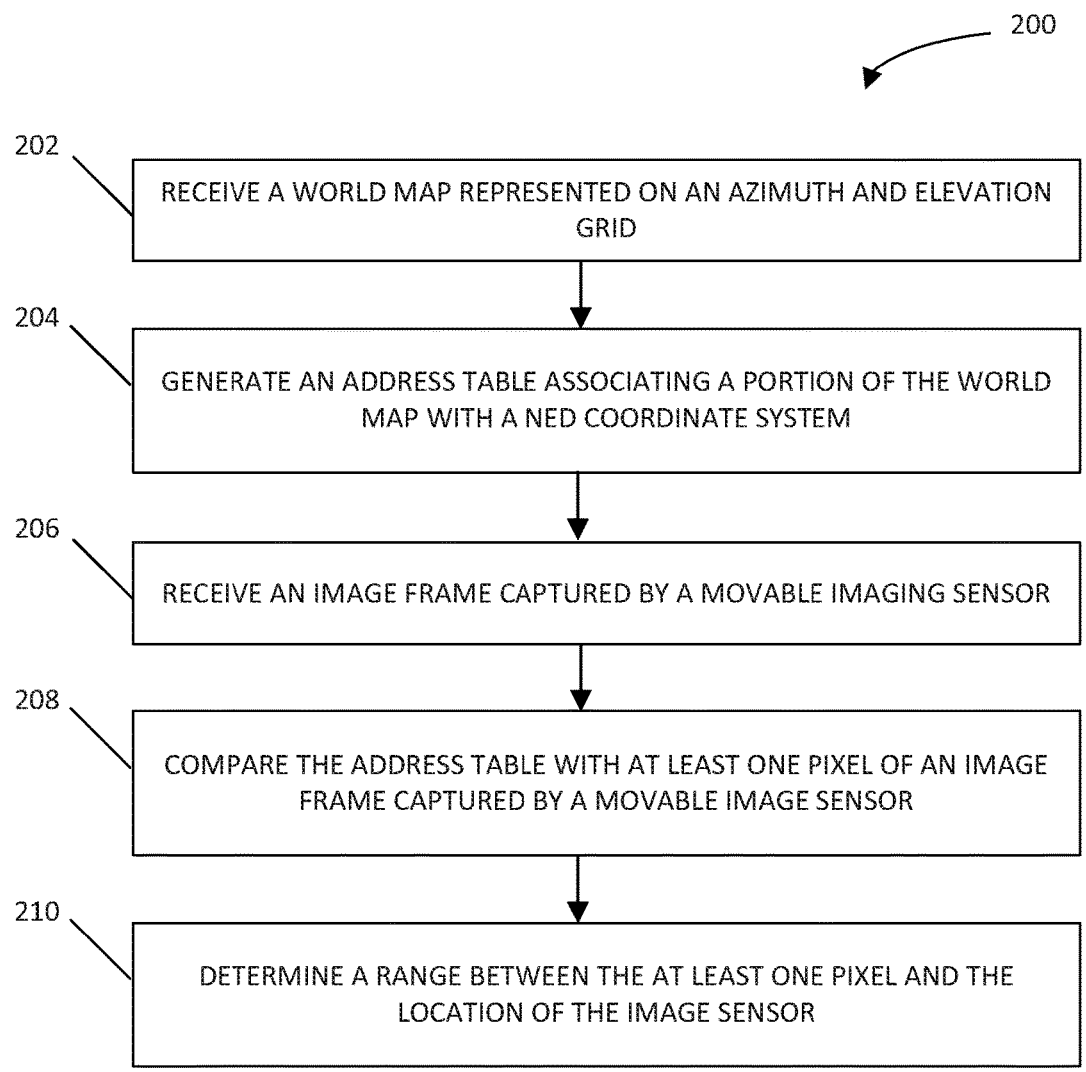
FIG. 2 is a flowchart illustrating a method for inertially stabilized range estimation mapping, according to an example embodiment.

FIG. 2 is a flowchart illustrating a method 200 for range estimation mapping, according to an example embodiment. The method 200 may be performed using one or more components of system 100 shown in FIG. 1.

In exemplary method 200, the world map component 110 receives and analyzes data indicating a world map at step 202. The data indicating a world map may be generated by stereo imagery using a satellite to create a digital global elevation model. In some embodiments, the world map component 110 analyzes and provides world map data for a particular location or area surrounding a particular location (for example, in the form of a sphere around the imaging sensor or the host platform). The world map component 110 may include various circuits, circuitry and one or more software components, programs, applications, apps or other units of code base or instructions.

At step 204, the address table component 120 generates an address table associating a portion of the world map with a north, east and down (NED) coordinates. In an example embodiment, the world map may be divided into a plurality of units, and each unit may be associated with a NED coordinate, and stored in a database. Each entry in the database may correspond to a unit of the world map and may be a 17-bit data array. The address table component 120 may generate the address table for a portion of the world map based on a particular location or area surrounding the particular location. The particular location may correspond to the location of the imaging sensor or the host platform. In some embodiments, the location of the imaging sensor or the host platform may change, and the address table component 120 updates the address table based on the new location. The address table component 120 may include various circuits, circuitry and one or more software components, programs, applications, apps or other units of code base or instructions.

At step 206, the frame component 130 receives an image frame captured by a movable imaging sensor, and may store and manage a plurality of frames captured by the moveable imaging sensor. In some embodiments, the movable imaging sensor is located on a moving airborne host platform. The frame component 130 may include various circuits, circuitry and one or more software components, programs, applications, apps or other units of code base or instructions. The programmable device 140 receives data related to the world map from the world map component 110, the address table from the address table component 120, and a frame from the frame component 130.

At step 208, the programmable device 140 compares the address table with at least one pixel of the frame in order to retrieve the corresponding 17 bit data array for the pixel location. At step 210, the programmable device 140 determines a range or distance between the at least one pixel of the frame (i.e., the location of the imaging sensor) and a location on earth by measuring the distance between the two locations using the information from the address table. The programmable device 140 may be a FPGA, a microprocessor, or any processing device capable of executing units of code or instructions.

The range component 150 may store the range, determined by the programmable device 140, between a pixel and the imaging sensor, and continue to store the determined ranges for all the pixels in a frame. The range component 150 may include various circuits, circuitry and one or more software components, programs, applications, apps or other units of code base or instructions.

Figure 3:
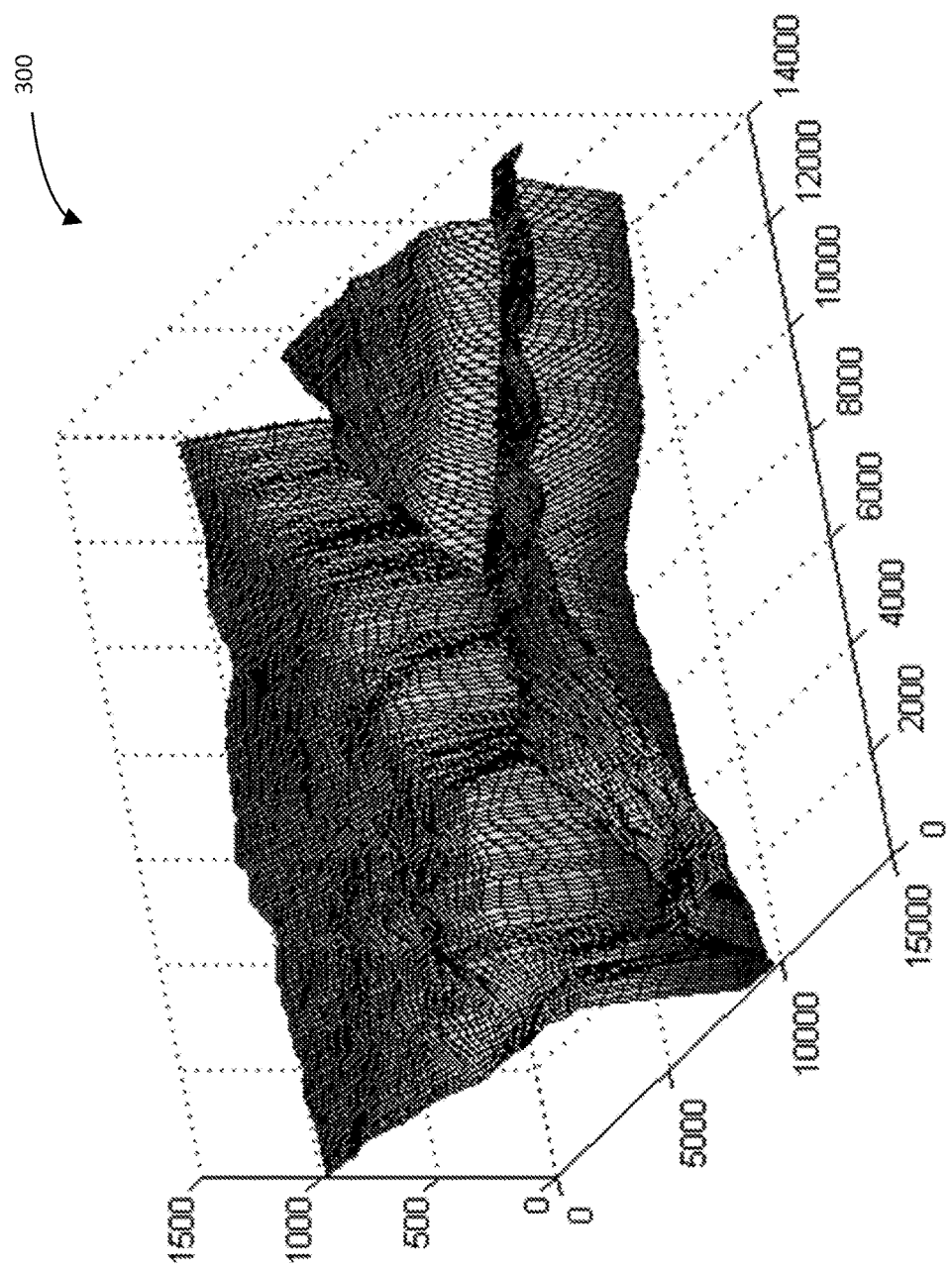
FIG. 3 depicts a simulated world map for a particular location, according to an example embodiment.

FIG. 3 is a graph 300 depicting a simulated world map for a particular location, according to an example embodiment. The graph 300 may be generated by the world component 110 described above. The axes in graph 300 are provided in meters. In this example, the graph 300 depicts a simulated world map for a mountainous region near the imaging sensor. The imaging sensor may be located in the center of the mountainous region. The graph 300 may be used to create the azimuth and elevation map shown in FIG. 4.

Figure 4:
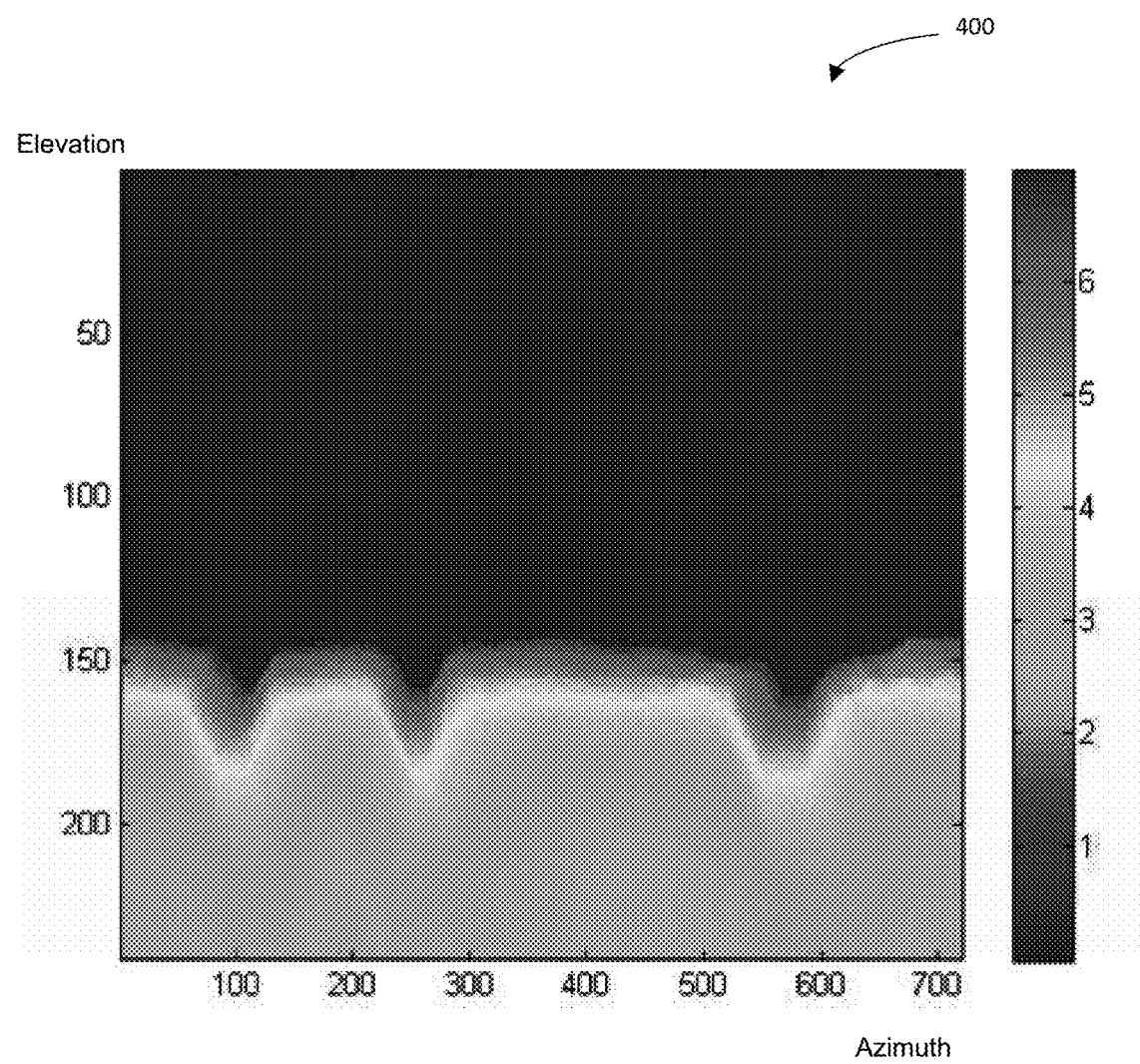
FIG. 4 depicts a world map for a particular location on an azimuth and elevation grid, according to an example embodiment.

FIG. 4 is a graph 400 depicting a world map for a particular location on an azimuth and elevation grid, according to an example embodiment. The graph 400 may be generated by the world component 110. In graph 400, the y-axis corresponds to elevation and ranges from −60 degrees to +60 degrees. The x-axis corresponds to azimuth, and ranges from 0 to 360 degrees. The color for each pixel represents the distance to that pixel per the legend on the right in FIG. 4. The legend is provided in kilometers. The graph 400 may be generated based on the mountainous region depicted in the simulated world map shown in FIG. 3.

Figure 5:
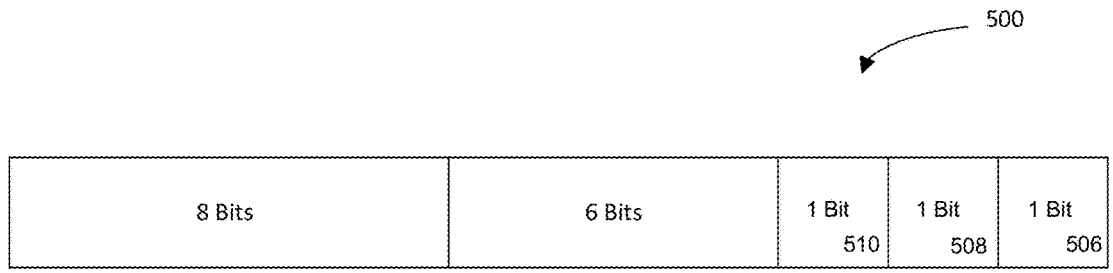
FIG. 5 illustrates a data array for an address table, according to an example embodiment.

FIG. 5 illustrates a data array 500 for an example address table, according to an example embodiment. As illustrated, the data array 500 may be a 17-bit data array. The typical world map table storing NED coordinates, that is conventionally provided as a 24-bit vector, is converted to a 17-bit data array in some embodiments. The section 502, consisting of 8 bits, stores data related to the down component of the world map. The section 504, consisting of 6 bits, stores dates related to the least significant 6 bits of the largest component of the 24-bit vector. The section 506, consisting of 1 bit, stores data related to the sign of the north vector. The section 508, consisting of 1 bit, stores data related to the sign of the east vector. The section 510, consisting of 1 bit, stores data related to the largest azimuth component. In some embodiments, section 510 may be 1 indicating the largest azimuth component as being north, and section 510 may be 0 indicating the largest azimuth component as being east. This 17-bit world map table is used as a look up table, and may be referred to herein as the address table. Reducing the size of the conventional 24-bit world map vector to a 17-bit data array provides an advantage in that the look up table now becomes 128 times smaller than it would be at 24-bit. That is, each look up operation is now much faster and the table takes 128 times less storage space.

Figure 9:
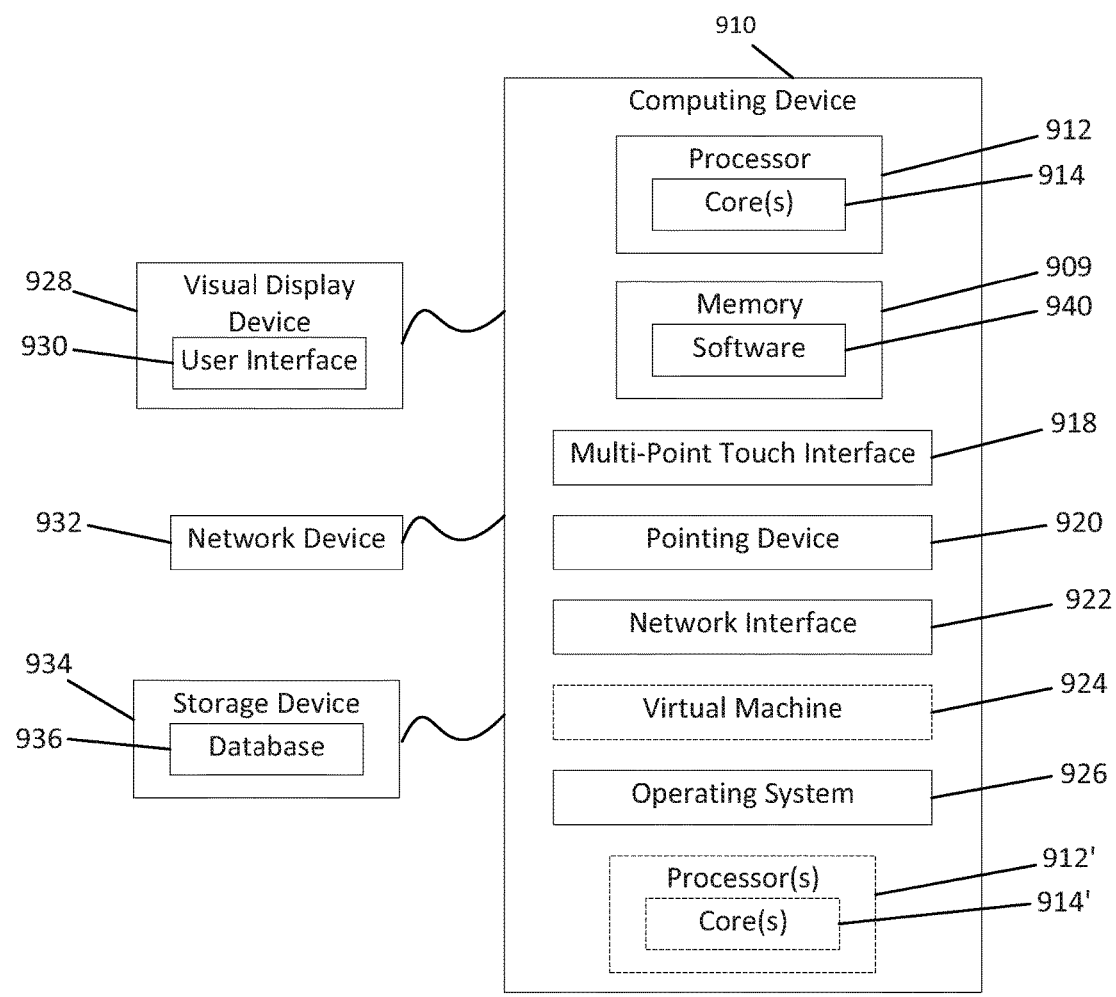
FIG. 9 is a block diagram of an exemplary computing device that can be used to implement exemplary embodiments of the range estimation system described herein.

When the method begins, the look up table is loaded from the memory, for example, memory 909 described in relation to FIG. 9. This table is precalculated and assigns each location in the 17-bit world map to a location in the azimuth and elevation map. For each image frame and for each pixel within the frame, the system determines the unit vector which describes which way a given pixel is pointing. This unit vector is a 24-bit vector. As described in relation to FIG. 5, the 24-bit vector is converted to the 17-bit data array 500, which the system then accesses to determine the location in the azimuth and elevation map that has the range value for that pixel.

Figure 6:
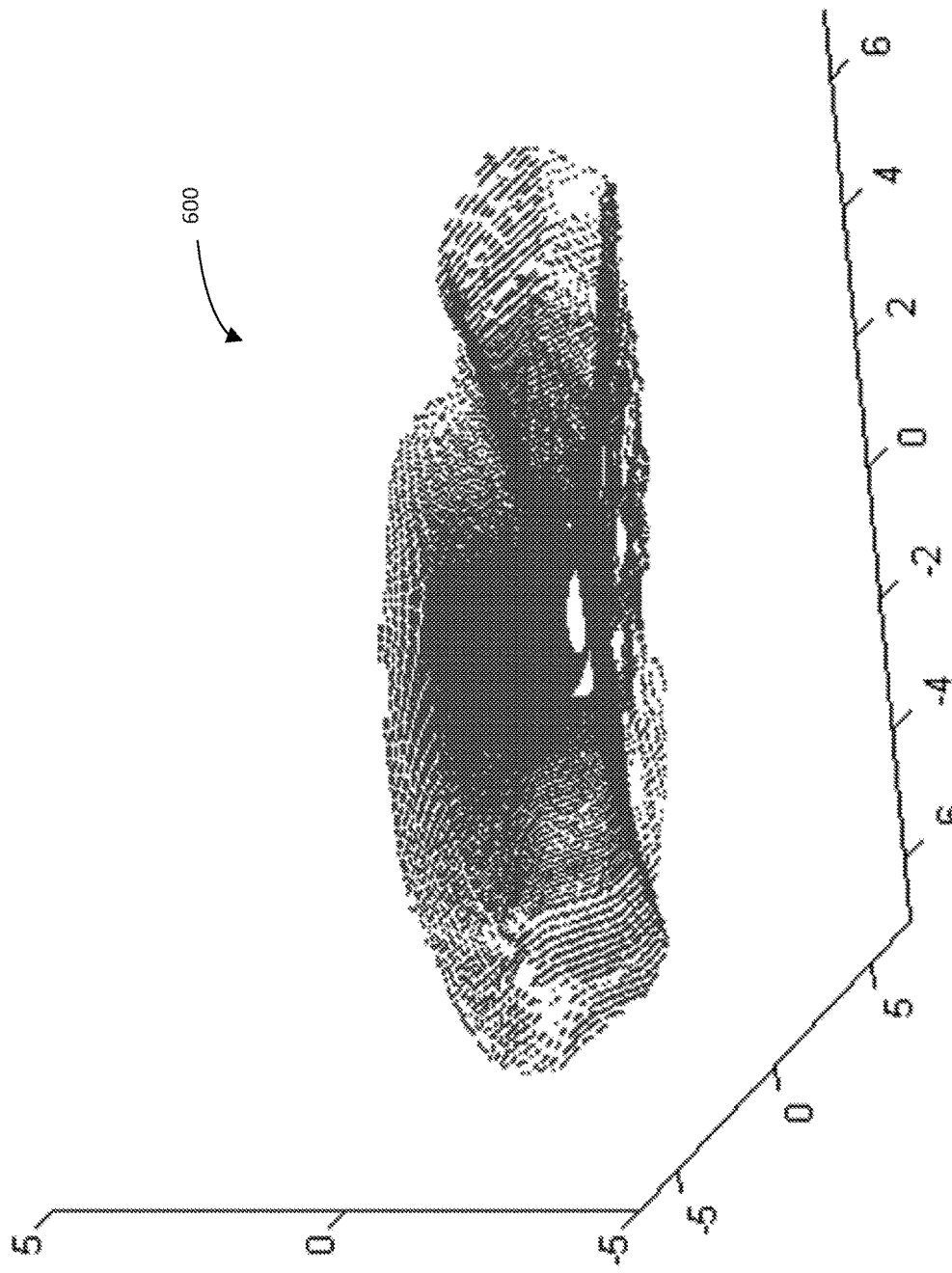
FIG. 6 depicts a simulated world map for a particular location after associating NED coordinates, according to an example embodiment.

FIG. 6 depicts a simulated world map 600 for a particular location after associating NED coordinates, according to an example embodiment. The map 600 is generated from using the NED coordinates stored in the 17-bit address table, and is a visual representation of the data stored in the 17-bit address table combined with the azimuth and elevation map. The axes are represented in kilometers.

Figure 7:
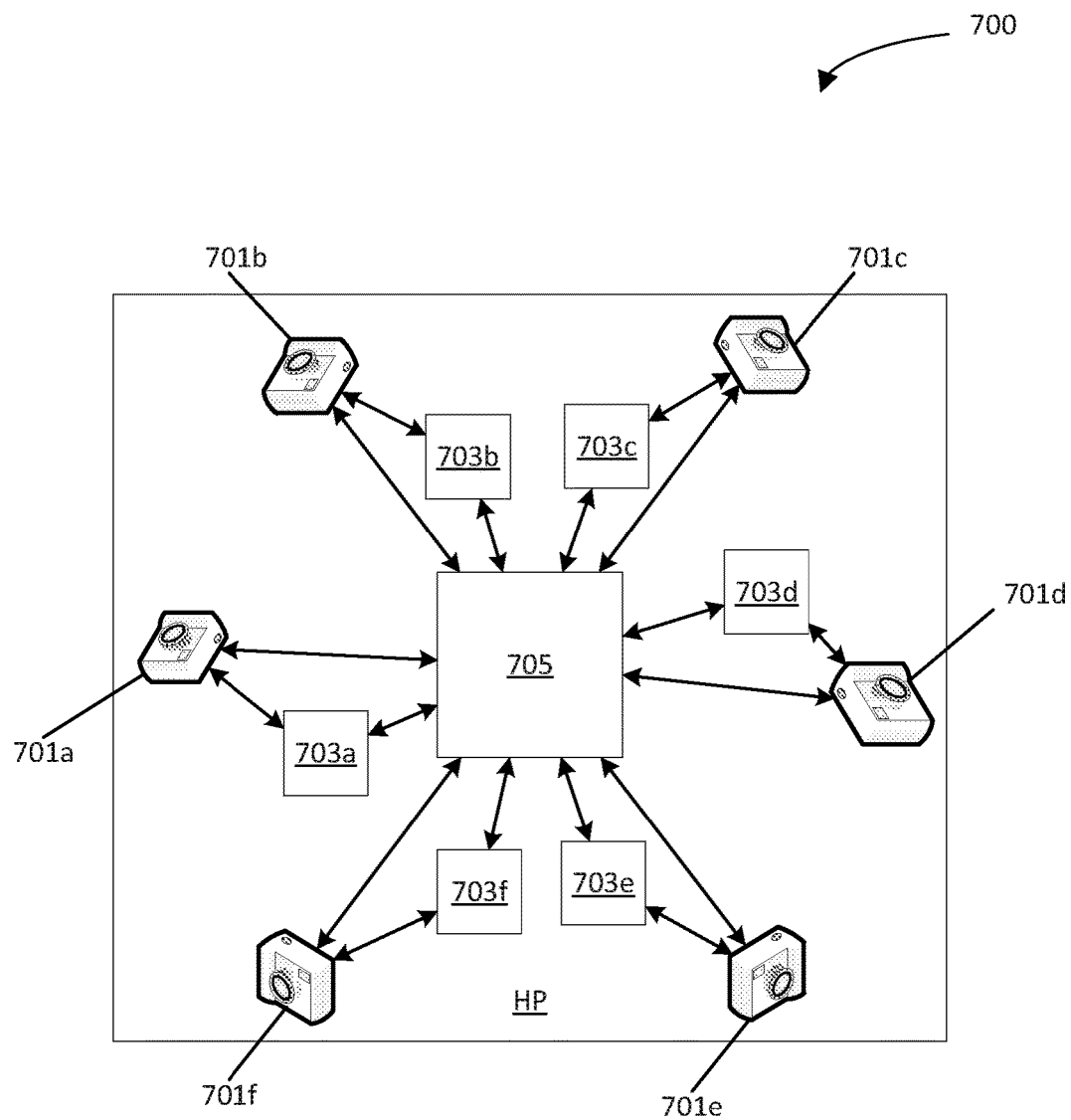
FIG. 7 is a block diagram depicting a system for a distributed on-board imaging system that can be used to implement exemplary embodiments of the range estimation system described herein.

FIG. 7 is a block diagram depicting a system 700 for a distributed on-board imaging system that can be used to implement exemplary embodiments of the range estimation system described herein. The on-board imaging system 700 can be installed on a host platform HP. HP may be, but is not limited to, an airborne host platform such as a fixed airplane, helicopter or drone. The system 700 includes a plurality of image sensors 701a-f installed on the host platform HP, each of the image sensors 701a-f being in electronic communication with at least one processor 703a-f, 705 installed on the host platform HP. As shown in FIG. 7, each image sensor 701a-f is in electronic communication with both a dedicated processor 703a-f and a central processor 705. However, it will be apparent in view of this disclosure that, in accordance with various embodiments, one or more of the image sensors 701a-f can connect only to a central processor 705. It will further be apparent in view of this disclosure that, in accordance with various embodiments, one or more of the image sensors 701a-f can connect only to a dedicated processor 703a-f. It will still further be apparent in view of this disclosure that any combination of sensors per processor or processors per sensor can be used in accordance with various embodiments.

Image sensors 701a-f can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 701a-f, in accordance with various embodiments can encompass any sensor configured to capture electromagnetic radiation in any spectrum for producing an image, including, for example, infrared radiation, visible light, ultraviolet radiation, x-rays, etc. Image sensors 701a-f may take a series of images at different times while HP is moving. For example, image sensors 701a-f may take images during different portions of a flight of an airborne HP.

Dedicated processors 703a-f and central processor 705 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 703a-f can be a FPGA for providing temporary storage of a limited number of data captures acquired by the a corresponding image sensor 701a-f and a coarse initial analysis while the central processor 705 can be a microprocessor for conducting more detailed analysis as needed. In various embodiments, the central processor 705 can perform all processing functions, eliminating the need for dedicated processors 703a-f. In various embodiments, the dedicated processors 703a-f can perform all processing functions, eliminating the need for a central processor 705. It will be apparent in view of this disclosure that any other combinations an ratios of processors and image sensors can be used in accordance with various embodiments.

Figure 8:
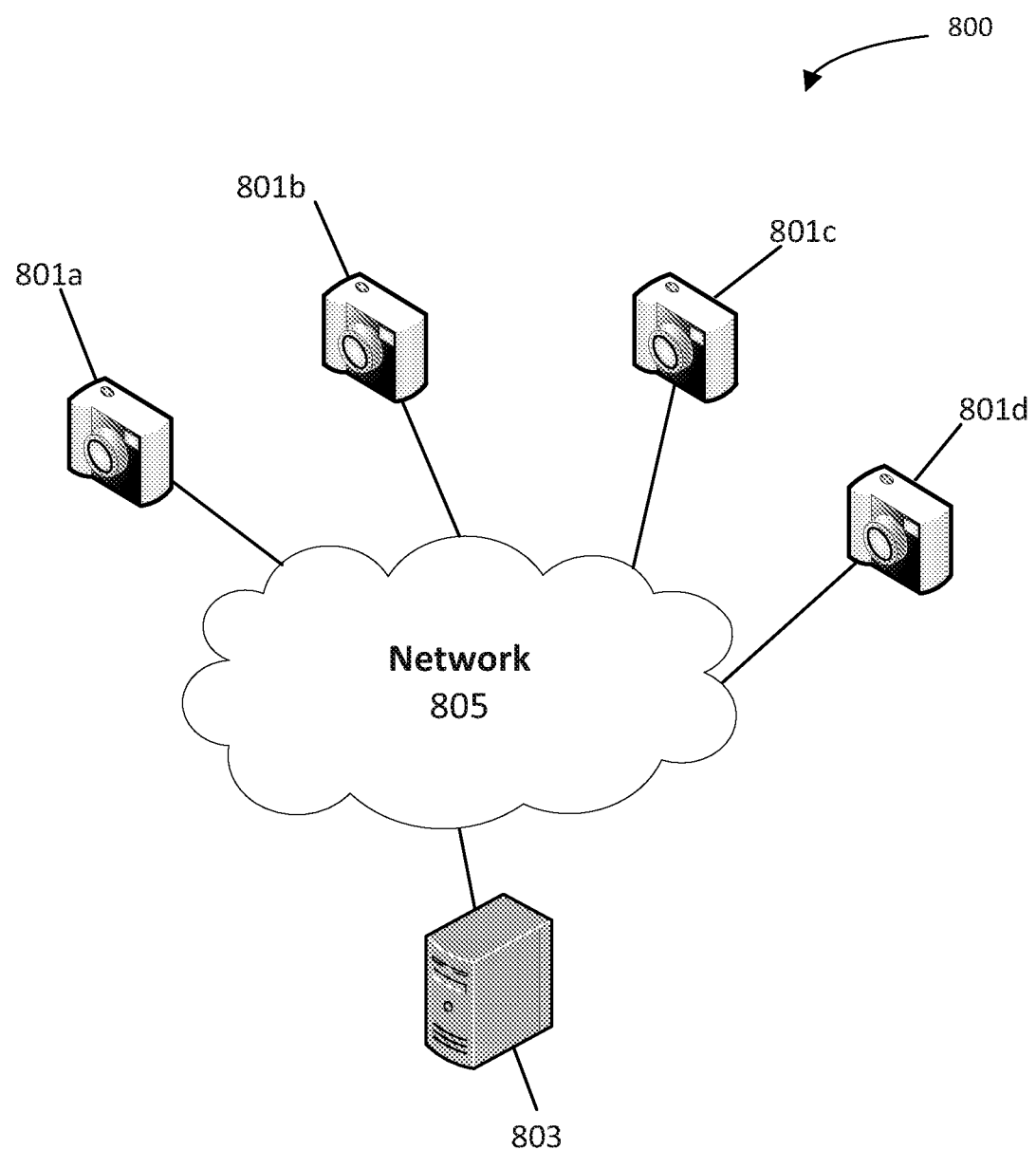
FIG. 8 is a block diagram depicting a distributed imaging system that can be used to implement exemplary embodiments of the range estimation system described herein.

FIG. 8 is a block diagram depicting a distributed imaging system 800 that can be used to implement exemplary embodiments of the range estimation system described herein. Although FIGS. 1 and 7 and portions of the exemplary discussion above, make reference to a centralized system 100, 700 operating with on one or more co-located image sensors and/or processors, one will recognize that various of the components and modules within the system 100, 700 may instead be distributed across a network 805 in separately or remotely located image sensors 801a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 803 such as one or more server systems, desktop computer devices, mobile computer devices, field-programmable gate arrays, microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 801a-d can be received by the remote processing system(s) 803 for frame registration and comparison. In some embodiments, the remote processing system(s) 803 can provide feedback to one or more of the image sensors 801a-d based on the frame registration and comparison. In some distributed remote imaging systems, the image sensors 801a-d and processing systems 803 of the system 100, 800 can be separately located and can be in communication with one another across the network 805.

FIG. 9 is a block diagram of an exemplary computing device 910 such as can be used, or portions thereof, in accordance with various embodiments and, for clarity, refers back to and provides greater detail regarding various elements of the system 100 of FIG. 1. The computing device 910 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 909 included in the computing device 910 can store computer-readable and computer-executable instructions or software for performing the operations disclosed herein. For example, the memory 909 can store a software application 940 which is configured to perform various of the disclosed operations (e.g., generating the address table based on NED coordinates and determining the range between the pixel and the location of the imaging sensor). The computing device 910 can also include configurable and/or programmable processor 912 and an associated core 914, and optionally, one or more additional configurable and/or programmable processing devices, e.g., processor(s) 912' and associated core(s) 914' (for example, in the case of computational devices having multiple processors/cores), for executing computer-readable and computer-executable instructions or software stored in the memory 909 and other programs for controlling system hardware. Processor 912 and processor(s) 912' can each be a single core processor or multiple core (914 and 914') processor. In some embodiments, processor 912 and processor(s) 912' can each be one or more of a field-programmable gate array (FPGA), a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 910 so that infrastructure and resources in the computing device can be shared dynamically. A virtual machine 924 can be provided to handle a process running on multiple processors so that the process appears to be using only one computing resource rather than multiple computing resources. Multiple virtual machines can also be used with one processor.

Memory 909 can include a computational device memory or random access memory, such as DRAM, SRAM, EDO RAM, and the like. Memory 909 can also include, for example, flip-flops, memory blocks, RAM blocks, programmable read-only memory, and the like. Memory 909 can include other types of memory as well or combinations thereof.

A user can interact with the computing device 910 through a visual display device 928, such as a computer monitor, which can display one or more user interfaces 930 that can be provided in accordance with exemplary embodiments. The computing device 910 can include other I/O devices for receiving input from a user, for example, a keyboard or any suitable multi-point touch interface 918, or a pointing device 920 (e.g., a mouse). The keyboard 918 and the pointing device 920 can be coupled to the visual display device 928. The computing device 910 can include other suitable conventional I/O peripherals.

The computing device 910 can also include one or more storage devices 934, such as a hard-drive, CD-ROM, or other computer readable media, for storing data and computer-readable instructions and/or software that perform operations disclosed herein. Exemplary storage device 934 can also store one or more databases 936 (e.g., image recognition database 110 and/or sorted object database 140) for storing any suitable information required to implement exemplary embodiments. The databases 936 can be updated manually or automatically at any suitable time to add, delete, and/or update one or more items in the databases.

The computing device 910 can include a network interface 922 configured to interface via one or more network devices 932 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X0.25), broadband connections (for example, ISDN, Frame Relay, ATM), wireless connections, controller area network (CAN), or some combination of any or all of the above. The network interface 922 can include a built-in network adapter, network interface card, PCMCIA network card, card bus network adapter, wireless network adapter, USB network adapter, modem or any other device suitable for interfacing the computing device 910 to any type of network capable of communication and performing the operations described herein. Moreover, the computing device 910 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 910 can run any operating system 926, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 926 can be run in native mode or emulated mode. In an exemplary embodiment, the operating system 926 can be run on one or more cloud machine instances.

The above description has been presented to enable a person skilled in the art to create and use a computer system configuration and related method and article of manufacture to recognize images based on multiple contextual factors. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for providing range estimations, said method comprising:
    providing a world map containing a plurality of location information on earth;
    generating an address table to provide pixel location information;
    receiving an image frame captured by a moving image sensor, wherein said image frame includes a plurality of pixels, wherein one of said pixels includes a full-bit unit vector;
    entering into said address table a reduced-bit version of said full-bit unit vector of said one pixel of said received image frame captured by said moving image sensor to obtain a pixel location information of said one pixel of said received image frame; and
    entering said pixel location information of said one pixel of said received image frame into an azimuth-elevation graph to yield a range between said one pixel of said received image frame and a location on earth.

2. The method of claim 1, wherein said full-bit unit vector is a 24-bit unit vector.

3. The method of claim 2, wherein said 24-bit unit vector includes an 8-bit information for north direction, an 8-bit information for east direction, and an 8-bit information for down direction.

4. The method of claim 1, wherein said azimuth-elevation graph is generated by utilizing said world map and a location information of said moving image sensor.

5. The method of claim 1, wherein said reduced-bit version of said full-bit unit vector of said one pixel of said received image frame is 17-bit.

6. The method of claim 5, wherein said address table is a 17-bit table.

7. The method of claim 1, wherein said moving image sensor is located on an aircraft.

8. A system for providing range estimations, said system comprising:
    a memory for storing
        a world map containing a plurality of location information on earth; and
        an address table to provide pixel location information;
    an image sensor for capturing an image frame, wherein said image frame includes a plurality of pixels, wherein one of said pixels includes a full-bit unit vector,
    an interface for entering a reduced-bit version of said full-bit unit vector of said one pixel of said captured image frame into said address table to obtain a pixel location information of said one pixel; and
    a processor for entering said pixel location information of said one pixel of said captured image frame into an azimuth-elevation graph to yield a range between said one pixel of said captured image frame and a location on earth.

9. The system of claim 8, wherein said full-bit unit vector is a 24-bit unit vector.

10. The system of claim 9, wherein said 24-bit unit vector includes an 8-bit information for north direction, an 8-bit information for east direction, and an 8-bit information for down direction.

11. The system of claim 8, wherein said azimuth-elevation graph is generated by utilizing said world map and a location information of said moving image sensor.

12. The system of claim 8, wherein said reduced-bit version of said full-bit unit vector of said one pixel of said captured image frame is 17-bit.

13. The system of claim 12, wherein said address table is a 17-bit table.

14. The system of claim 8, wherein said moving image sensor is located on an aircraft.

* * * * *